(12) United States Patent
Aguirre et al.

(10) Patent No.: US 6,588,345 B1
(45) Date of Patent: Jul. 8, 2003

(54) SYSTEM FOR IMPROVING THE FLOWABILITY OF HYGROSCOPIC MATERIALS FROM A HOPPER

(75) Inventors: Edgar L. Aguirre, Clewiston, FL (US); Donald H. Griffin, Clewiston, FL (US); William A. Raiola, Clewiston, FL (US); Derek Duplooy, Clewiston, FL (US)

(73) Assignee: United States Sugar Corporation, Clewiston, FL (US)

(*) Notice: Subject to any disclaimer, the term of this patent is extended or adjusted under 35 U.S.C. 154(b) by 0 days.

(21) Appl. No.: 10/125,658

(22) Filed: Apr. 18, 2002

(51) Int. Cl.⁷ .................................................. B61D 3/00
(52) U.S. Cl. .................. 105/247; 206/204; 222/251; 222/190; 34/165; 34/80
(58) Field of Search ............................. 105/247, 248, 105/239, 377.07; 298/1 R, 1 V, 8 H, 24, 27; 222/251, 190; 34/80, 165, 168; 206/204; 220/1.5; 454/183

(56) References Cited

U.S. PATENT DOCUMENTS

| 1,050,706 A | * | 1/1913 | Taylor ........................ 96/118 |
|---|---|---|---|
| 2,317,882 A | * | 4/1943 | Boesel ........................ 96/148 |
| 2,492,830 A | * | 12/1949 | Bannister .................... 222/190 |
| 2,540,758 A | * | 2/1951 | Rinnman ..................... 96/148 |
| 2,554,879 A | * | 5/1951 | Race ......................... 96/117.5 |
| 2,676,078 A | * | 4/1954 | Young ........................ 96/148 |
| 3,115,010 A | * | 12/1963 | Collier ....................... 60/200.1 |
| 3,271,089 A | * | 9/1966 | Krellen ...................... 312/31.2 |
| 5,148,613 A | * | 9/1992 | Cullen .......................... 34/81 |
| 5,813,564 A | * | 9/1998 | Luo .......................... 220/522 |
| 6,158,580 A | * | 12/2000 | Davis ........................ 206/204 |
| 6,289,606 B2 |   | 9/2001 | Gillette et al. |
| 6,308,826 B1 | * | 10/2001 | Merrell ...................... 206/204 |
| 6,412,422 B2 | * | 7/2002 | Dohr et al. ................. 105/282.3 |

\* cited by examiner

*Primary Examiner*—Mark T. Le
(74) *Attorney, Agent, or Firm*—Dorsey & Whitney LLP

(57) ABSTRACT

An apparatus and a method for improving the flowability of hygroscopic materials from a hopper wherein a desiccant containment device containing a desiccant material is located within a hopper that is used for transporting or storing granular or powdered bulk materials. The desiccant material captures moisture from the hopper atmosphere in order to promote the flowability of the bulk material.

19 Claims, 4 Drawing Sheets

SYSTEM FOR IMPROVING THE FLOWABILITY OF HYGROSCOPIC MATERIALS FROM A HOPPER

FIELD OF THE INVENTION

The present invention relates to the removal of moisture from the atmosphere of a transport or storage hopper for powdered or granular bulk materials. More specifically, the present invention relates to improving the flowability of powdered or granular bulk materials by using desiccant to remove an appropriate amount of moisture from the atmosphere of a transport or storage hopper.

BACKGROUND OF THE INVENTION

Powdered and granular bulk materials are often shipped or stored in hoppers. Often, these materials are hygroscopic in that under certain conditions they will exchange moisture with the surrounding atmosphere. Significant changes in ambient temperature and humidity levels will trigger hygroscopic activity in the bulk material, making the bulk material difficult to discharge and unload from the hopper.

The problem is especially common in the interstate shipping industries like railroads and trucking where the bulk material contained in a hopper car or trailer is subjected to significant climatic changes as the material is transported across the country. For example, a bulk material like granular sugar, powdered flour, or cement is loaded into a covered hopper rail car in a warm humid southern state. The loaded car is then shipped to a colder northern climate. As the car moves further north, the interior surfaces of the hopper, i.e., its sidewalls, endwalls, and ceiling, become colder. The moisture in the atmosphere of the hopper condenses out of the atmosphere onto the sidewalls, endwalls, and ceiling. The moisture falls from the ceiling or runs down the walls to saturate the bulk material in various locations. The saturated bulk material may remain wet or it may dry into hardened chunks. In either case, the flowability of the bulk material is decreased, the result being that the load will not easily flow from the hopper when unloaded, especially the parts of the load that were saturated. Likewise, as the car moves it is subjected to various humidity levels, which can cause the bulk material to absorb or give-up additional moisture, again resulting in hardening or clumping of the bulk material.

Consequently, there is a need in the art for a technique for improving the flowability of hygroscopic materials from a hopper by capturing available moisture from the atmosphere within the hopper.

BRIEF SUMMARY OF THE INVENTION

The present invention, in one embodiment, is a railcar for improving the flowability of sugar from a hopper. The rail car includes at least one hopper, a hatch located in an upper wall of the rail car, the hatch allowing access to the at least one hopper, and a desiccant containment device adapted to hold a desiccant, the desiccant containment device located within the hopper above a fill level and secured to the rail car within the hatch.

Another embodiment of the present invention is a method for improving the flowability of hygroscopic materials from a hopper. The method includes opening a hatch into the hopper, locating one or more desiccant containment devices within the hopper, placing a desiccant within the desiccant containment devices, and closing the hatch.

While multiple embodiments are disclosed, still other embodiments of the present invention will become apparent to those skilled in the art from the following detailed description. As will be apparent, the invention is capable of modifications in various obvious aspects, all without departing from the spirit and scope of the present invention. Accordingly, the drawings and detailed description are to be regarded as illustrative in nature and not restrictive.

DETAILED DESCRIPTION

Figure 1:
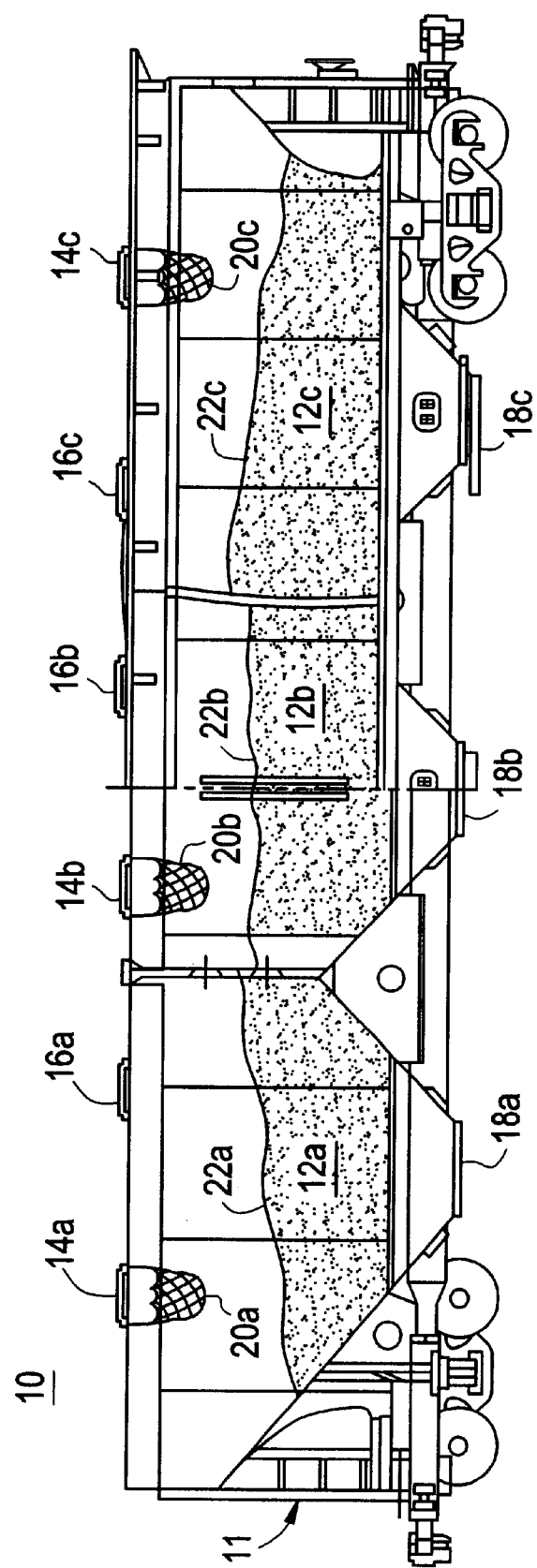
FIG. 1 shows a side sectional view of a modified rail car adapted for transporting bulk materials.

FIG. 1 shows a side sectional view of a transport system 10 adapted for transporting bulk materials in a rail car modified according to the present invention. While the following discussion describes the system of the present invention for use with a rail car, it will be apparent from the following description that the system could also be used with other transport methods, such as trucking or shipping.

As shown in FIG. 1, the transport system 10 includes a rail car 11, which includes a first hopper 12a, a second hopper 12b, and a third hopper 12c. As further shown, each of the hoppers 12a, 12b, 12c includes a corresponding set of hatches 14 and 16 and a dispensing chute 18. Each of the hatches 14a, 14b, 14c includes a corresponding desiccant containment device 20 therein. Each of the hoppers 12 is loaded with bulk material 22.

The bulk material 22 may be any type of hygroscopic powdered or granular material, including for example, sugar, salt, flour, grain, cement, potash, silicates, or plastic granules. In other embodiments of the present invention, the rail car 11 has a greater or lesser number of hoppers 12. In other embodiments, the hoppers 12 have a greater or lesser number of hatches 14, 16. Also, as further described below with reference to FIGS. 4A and 4B, in some embodiments, the desiccant containment device 20 is placed within an access door, rather than within one of the standard rail car hatches 14, 16. Where the bulk materials 22 are food materials, the desiccant containment device 20 should be constructed of FDA approved materials. Where the bulk materials 22 are materials other than food, the desiccant containment device 20 should be constructed of materials that will be inert to the bulk materials 22.

Figure 2:
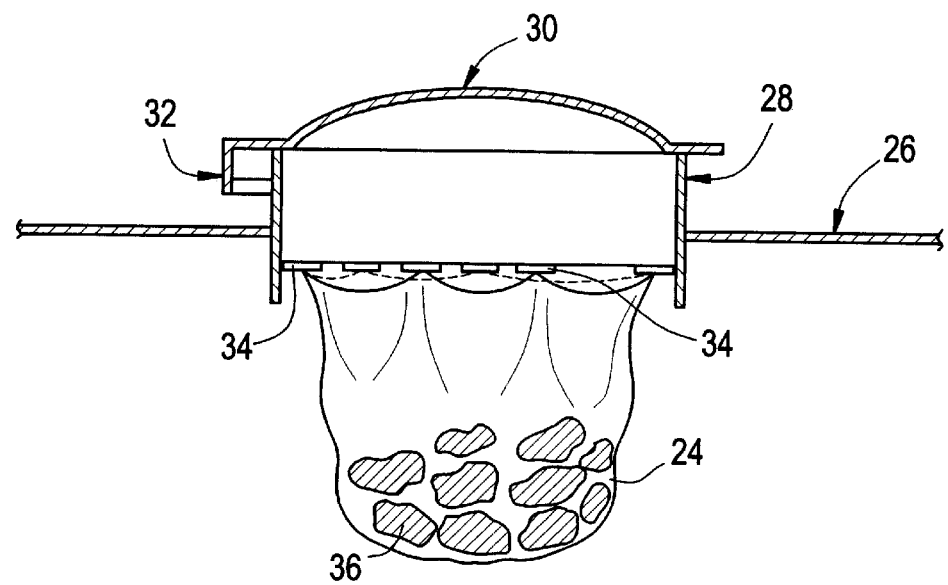
FIG. 2 shows a side section view of a net desiccant containment device installed in a hatch of a rail car, according to one embodiment of the present invention.

FIG. 2 shows a side sectional view of a desiccant containment device 20, which includes a net 24 installed in the hatch 14. As shown in FIG. 2, the hatch 14 is located in the roof 26 of the rail car 11. In the embodiment shown, the hatch 14 has a filling neck 28, a hatch cover 30, and a hinge 32. The filling neck 28 extends above and below the roof 26 and allows access to the interior hopper 12 of the rail car 11. This access allows the rail car to be filled with bulk materials 22 for rail shipment. The access may also allow workmen and their equipment to enter the hoppers 12 for cleaning and repair purposes. The hatch cover 30 covers the filling neck 28 and is rotatably connected to the filling neck 28 by one or more hinges 32.

The net 24 is suspended from lugs 34 (or similar attachment devices like hooks, rings or snaps) connected around to the filling neck 28 around its periphery. In one embodiment, the net 24 is made of heavy-duty nylon. In other embodiments, the net 24 is made of other materials including, for example, synthetic materials like the various polymers or synthetic rubbers, natural materials like cotton, canvas, silk or rubber, or metallic materials like stainless steel wire mesh. In one embodiment, the lugs 34 are stainless steel and are welded to the filling neck 28. In another embodiment, the lugs 34 are constructed of materials other than stainless steel, such as other metals or synthetic materials and are connected to the filling neck 28 by mechanical means such as bolts or screws. The lugs 34 could also be connected to other areas on the interior of the hopper depending on where the desiccant containment device 20 is ultimately located (see for example FIGS. 4A and 4B). In one embodiment, the net 24 is a basket. In another embodiment, the net 24 is a gas and/or water vapor permeable bag. The bag is suspended from the filling neck 28 (or another location within the hopper 12) by the lugs 34. The bag could be made of materials such as cotton, canvas, silk, nylon, rayon, or any other suitable material.

As further shown in FIG. 2, the net 24 holds and supports one or more packages of desiccant 36. The net 24 holds an appropriate amount of desiccant 36, as further described below.

Figure 3A:
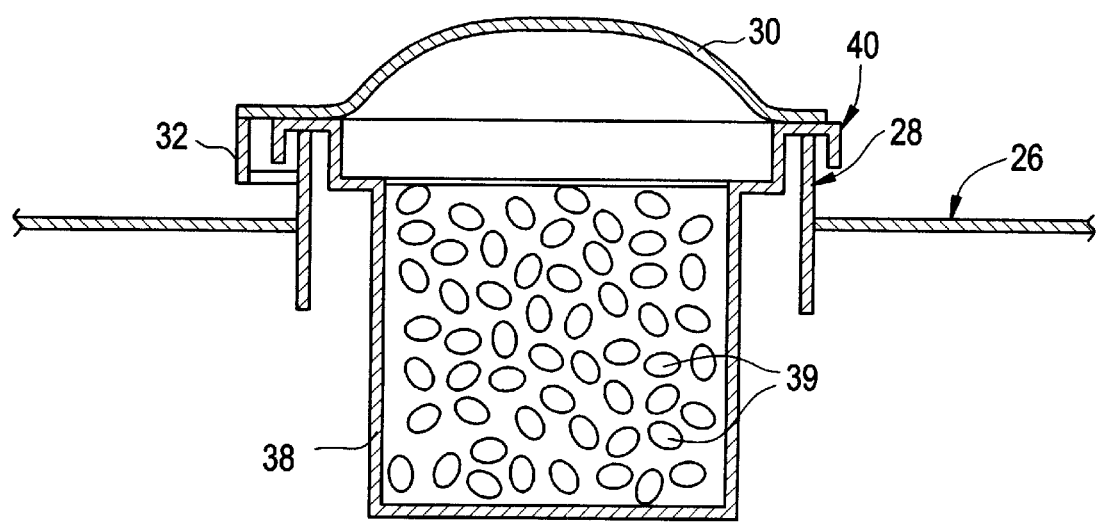
FIGS. 3A–3C show side sectional views of a basket desiccant containment device installed in a hatch of a rail car, according to a second embodiment of the present invention.
Figure 3B:
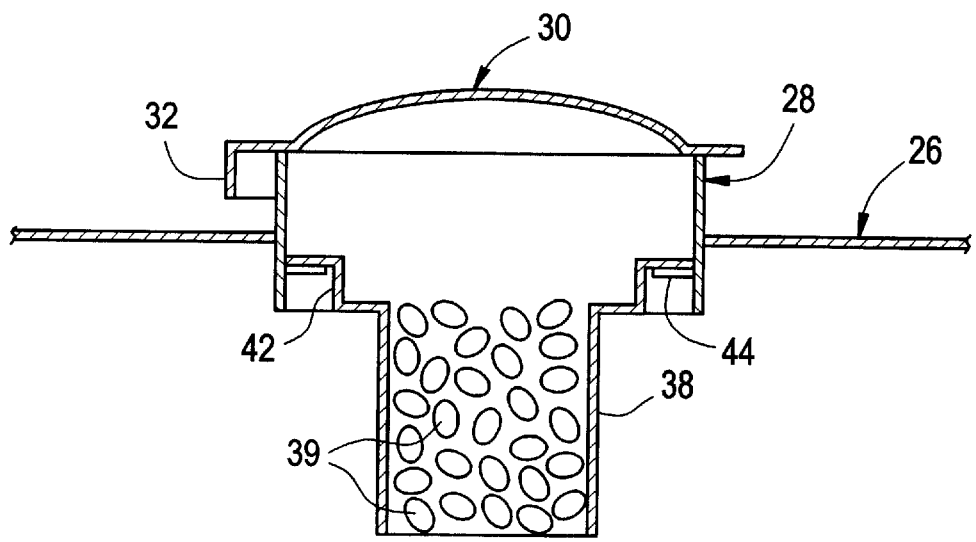
Figure 3C:
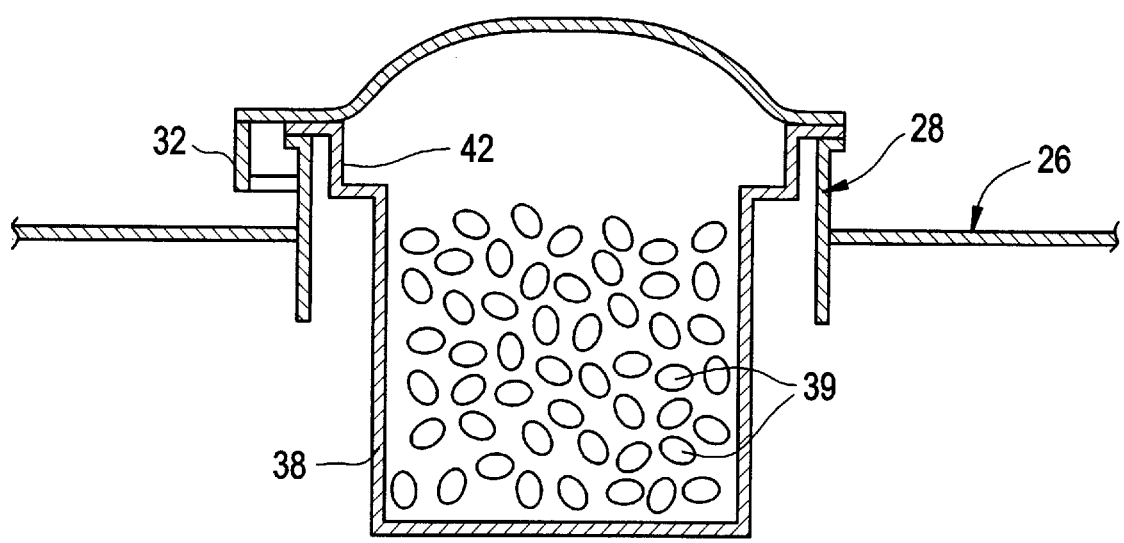

FIGS. 3A–3C show sectional views of a desiccant containment device 20, which includes a basket 38 mounted inside the hatch 14. As shown in FIGS. 3A, 3B, and 3C, the basket 38 includes perforations 39 to allow communication of gases, liquids, and vapor between the hopper 12 and the desiccant inside the desiccant containment device 20. As shown in FIG. 3A, the basket 38 includes a U-shaped lip 40 adapted to mate with the filling neck 28, such that the basket 38 is suspended from the filling neck 28. In one embodiment, the basket 38 is a mesh or wire construction. In various embodiment, the basket is made of metallic materials such as stainless steel, cotton, canvas, synthetic materials such as polymers, or any other suitable material. In the embodiment shown in FIG. 3B, the basket 38 includes a ledge 42 extending generally outward around an upper circumference, and the filling neck 28 includes a circumferential lip 44. When placed into the hatch 12, the ledge 42 of the basket 38 is supported by the circumferential lip 44. In one embodiment either the ledge 42 or the circumferential lip 44 further includes a rubber gasket (not shown). In one embodiment, the ledge 42 of the basket 38 is supported by lugs, hooks, or rings located around the periphery of the filling neck 28. In the embodiment shown in FIG. 3C, the basket 38 includes a ledge 42 extending generally outward around an upper circumference. The ledge 42 shown in FIG. 3C is sized to mate with an upper end of the filling neck 28, to support, the basket 38.

Figure 4A:
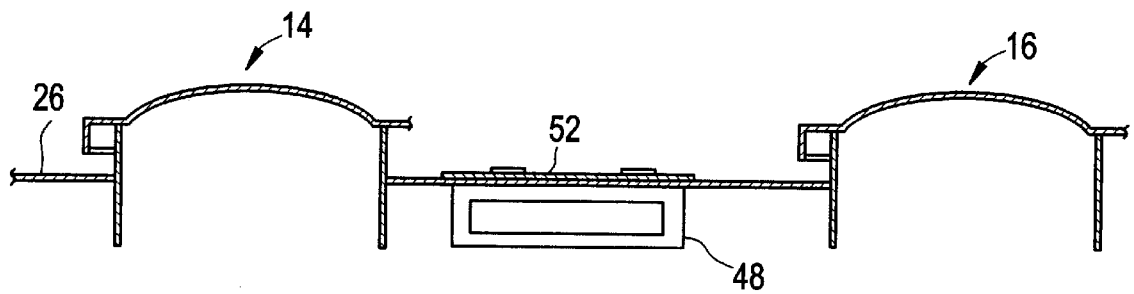
FIGS. 4A and 4B show side sectional views of a desiccant containment device installed in an access door of a rail car, according to a third embodiment of the present invention.
Figure 4B:
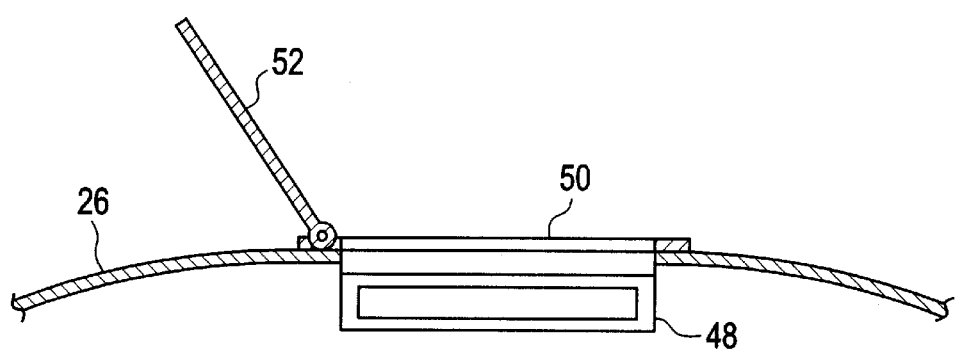

FIGS. 4A and 4B show a sectional view of a desiccant containment device 20, which includes a container 48 installed in an access port 50. As further shown in FIGS. 4A and 4B, the access port 50 is covered by an access door 52. The size of the container 48 and the access port 50 will vary depending upon the amount of desiccant necessary, as further described below. In various embodiments, the container 48 is either a net or a basket, made of any of the materials set forth above. Also, in various embodiments, the container is mounted in the access port 50 using any of the various techniques set forth above. The embodiment shown in FIGS. 4A and 4B allows mounting of the desiccant without blocking any of the hatches 14, 16. A skilled artisan will recognize that the transport system 10 of the present invention will be effective as long as the desiccant containment device 20 is located within the hopper 12 and above the level of the bulk material 22.

In one embodiment, the desiccant 36 (shown in FIG. 2) is simply located within the desiccant containment device 20. In another embodiment, the desiccant 36 is single, double, or tripled bagged before being placed within the desiccant containment device 20. The bags are constructed of vapor-permeable materials such as cotton, canvas or synthetic materials like very fine, high-density polyethylene fibers similar to the fabric available from E.I. duPont de Nemours and Company under the name TYVEK®. Again, where the bulk materials 22 are food materials, the desiccant 36 and the bags should be made of FDA approved materials. Where the bulk materials 22 are materials other than food, the desiccant 36 and the bags should be made of materials that will be inert to the bulk materials 22.

An example of one method of utilizing the subject invention will now be narrated with reference to FIGS. 1 and 2. While the following example is given in the context of sugar being shipped in a covered rail hopper with six round hatches and a double bagged desiccant, it must be noted that the following method is equally applicable to shipment of other materials, for use with other transport or storage hoppers, for use with other hatch types or configurations, and for use with other desiccant bagging arrangements.

After a rail car 11 is loaded to capacity with sugar, a desiccant containment device 20 is located at the hatches 14 in each hopper 12, using a technique set forth above. Ideally, the desiccant containment devices 20 will be installed so that they are suspended above the sugar. In one embodiment, approximately 500 grams of the desiccant is placed inside primary bags, and secondary bags are each filled with approximately thirty-five sealed primary bags. Since this example is in the context of food materials, the desiccant will be a FDA approved food grade silica gel desiccant. The secondary bag will be made of a FDA approved food grade loosely woven cotton or canvas material while the primary bags will be made of a FDA approved material like very fine, high-density polyethylene fibers similar to the fabric available from E.I. duPont de Nemours and Company under the name TYVEK®.

After the primary bags are inserted into the secondary bags, the secondary bags are sealed and placed within the desiccant containment device 20. The hatch covers 30 are then secured shut. The desiccant will how capture moisture within the hopper that is released from the sugar or present in the hopper atmosphere as a result of changes in humidity and ambient temperature as the rail car 11 travels from its origin to its destination. By capturing the released moisture, the desiccant containment devices 20 preserve the flowability of the sugar and reduce unloading difficulties at the destination. The number of desiccant containment devices 20 employed will depend on the type, amount, and moisture content of the bulk material 22 shipped or stored and the expected changes in humidity and ambient temperature to be encountered.

In one example, the amount of desiccant is based on tests conducted with rail cars filled with approximately 200,000 pounds of sugar and shipped from southern Florida to the northeastern part of the United States. In this example, about 105 pounds of desiccant were used (roughly one pound of desiccant for every 1900 pounds of sugar). This amount was found to significantly decrease or eliminate the amount of moisture condensation on the interior roof and sidewalls of the covered hopper rail car as compared to the amounts of moisture normally encountered without the use of the desiccant containment devices 20. Also, utilizing this amount of desiccant significantly improved the flowability of the sugar and decreased the amount of unloading difficulties as compared to the flowability and unloading difficulties encountered without the use of the desiccant containment devices 20. In another embodiment of the present invention, one pound of desiccant is used for every 1500 to 2500 pounds of sugar.

In other embodiments, the ratio of desiccant to bulk material will change depending on the particular climactic changes expected during shipment, as will be apparent to one skilled in the art. Those skilled in the art will be able to arrive at the amount of desiccant appropriate for the amount and type of bulk material 22 being transported or stored and the amount of moisture that will be released from the bulk material 22 or present in the atmosphere of the hopper on account of climatic conditions. Therefore, the subject invention should not be limited only to applications involving sugar, but should instead be interpreted to include all powdered or granular bulk material 22.

Although the present invention has been described with reference to preferred embodiments, persons skilled in the art will recognize that changes may be made in form and detail without departing from the spirit and scope of the invention.

We claim:

1. An apparatus, in combination with a railcar hopper, for improving the flowability of hygroscopic material from a the hopper, the apparatus comprising:
   a containment device located within the hopper above the hygroscopic material; and
   a flow promoting desiccant adapted to capture moisture from the hopper to promote the flowability of the hygroscopic material, the flow promoting desiccant located within the containment device.

2. The apparatus of claim 1 wherein the containment device is a net, a gas permeable bag, a basket, or a perforated bucket.

3. The apparatus of claim 2 further comprising one or more primary bags, the primary bags adapted to hold the flow promoting desiccant.

4. The apparatus of claim 2 further comprising one or more primary bags adapted to hold the flow promoting desiccant and a secondary bag holding the primary bags.

5. The apparatus of claim 1 wherein the containment device is suspended from a plurality of attachment devices that are connected to a hatch of a hopper.

6. The apparatus of claim 1 wherein the containment device contains about 1 pound of flow promoting desiccant for every about 1500 to about 2500 pounds of sugar.

7. The apparatus of claim 1 further comprising a rail car for supporting and transporting the hopper.

8. The apparatus of claim 7 further comprising a hatch located in an upper wall of the rail car and wherein the containment device is mounted within the hatch to facilitate loading and unloading of the flow promoting desiccant.

9. A railcar for improving the flowability of sugar from a hopper, the rail car comprising:
   at least one hopper;
   a hatch located in an upper wall of the rail car, the hatch allowing access to the at least one hopper; and
   a containment device holding a flow promoting desiccant, the containment device located within the hopper above a fill level and secured to the rail car within the hatch.

10. The apparatus of claim 9 wherein the containment device is a net and the net is mounted to lugs located around a periphery of the hatch.

11. The apparatus of claim 9 wherein the hatch is an access door distinct from a fill hatch used to load the rail car with sugar.

12. The apparatus of claim 9 wherein the containment device is a perforated bucket.

13. The apparatus of claim 11 wherein the perforated bucket includes a U-shaped lip adapted to mate with a filling neck of the hatch to support the perforated bucket within the hatch.

14. The apparatus of claim 11 wherein the hatch includes a circumferentially-extending lip and the perforated bucket includes a ledge, the ledge adapted to contact the lip and support the perforated bucket within the hatch.

15. The apparatus of claim 9 wherein the containment device contains about 1 pound of flow promoting desiccant for every about 1500 to about 2500 pounds of sugar.

16. A method for improving the flowability of hygroscopic materials from a railcar hopper, the method comprising:
   providing the hopper;
   opening a hatch into the hopper;
   locating one or more desiccant containment devices within the hopper;
   improving the flowability of the materials by placing a desiccant within the desiccant containment devices; and
   closing the hatch.

17. The method of claim 16 wherein the desiccant containment device is a net, a gas permeable bag, a moisture permeable bag, a basket, or a perforated bucket.

18. The method of claim 16 wherein the desiccant is provided to the desiccant containment device by placing the desiccant within one or more primary bags and placing the desiccant containing primary bags within the desiccant containment device.

19. The method of claim 16 wherein the desiccant is provided to the desiccant containment device by placing the desiccant within one or more primary bags, placing the desiccant containing primary bags within a secondary bag, placing the secondary bag within the desiccant containment device.

* * * * *